Patented Aug. 11, 1942

2,292,949

UNITED STATES PATENT OFFICE 2,292,949

PROCESS FOR CATALYTIC HYDROGENATION

Wilbur A. Lazier and Benjamin W. Howk, Wilmington, Del., assignors to E. I. du Pont de Nemours & Company, Wilmington, Del., a corporation of Delaware No Drawing. Application September 13, 1940,
Serial No. 356,644

4 Claims. (Cl. 260—464)

This invention relates to catalytic hydrogenation processes and more particularly to a process for the catalytic hydrogenation of 2-iminonitriles.

Recent developments in the field of polymeric chemistry have served to emphasize the importance of devising practical routes to bi-functional organic intermediates suitable for the synthesis of condensation-type polymers. Among a wide variety of materials of this class, the aliphatic diamines and aminonitriles have assumed especial importance owing to the success with which they have been transformed into resins, polymers and other valuable products of widespread commercial utility.

Although in many cases, successful processes for manufacturing diamines and aminonitriles have been developed, in several instances desirable intermediates of potential practical importance have remained relatively inaccessible owing to the lack of suitable raw materials or satisfactory and economical synthetic processes. For example, 2-aminonitriles and derivatives of trimethylenediamine, which come within the general class of polymer intermediates referred to above, have been prepared by conventional laboratory methods, such as reacting ammonia with the corresponding halogen derivatives, but none of the methods hitherto employed have shown attractive possibilities for commercialization; not only because of a dearth of appropriate raw materials but because of the inefficient, costly, and tedious procedures involved.

It is an object of this invention to overcome the disadvantages and problems of the prior art and to provide a new and improved process for the catalytic hydrogenation of 2-iminonitriles.

Other objects and advantages of this invention will be apparent from the following specification in which its details and preferred embodiments are described.

According to this invention, 2-iminonitriles are brought into contact in the liquid phase with hydrogen at elevated temperatures and pressures in the presence of anhydrous ammonia and finely divided base metal hydrogenation catalysts of the eighth group of the periodic table. By selecting appropriate conditions within the scope of the invention as described hereinafter, the rate and extent of hydrogenation are controlled to yield the corresponding 2-aminonitrile, the corresponding 1,3-diaminoalkane, or both as the major products of the reaction.

2-iminonitriles are converted to 2-aminonitriles or 1,3-diaminoalkanes according to the following general procedure: a sample of a 2-iminonitrile, anhydrous ammonia, a solvent such as methanol, and a hydrogenation catalyst comprising a finely divided base metal catalyst of the eighth group of the periodic table are charged into an autoclave provided with means for efficient agitation and adapted to operation at elevated temperatures and pressures. Hydrogen under pressure is admitted to the autoclave until the hydrogen partial pressure is at least ten atmospheres and the total pressure is preferably within the range from 1500–3000 lb. per square inch, although total pressures of 1000 atmospheres and higher may be utilized if desired. The mixture is then heated to a temperature of from 50° to 170° C., preferably to between 100° and 150° C. Under these conditions, hydrogen is absorbed smoothly during a period of 1 to 5 hours, fresh amounts of hydrogen being added from time to time, if necessary, to maintain the total pressure within the preferred working range.

If it is desired to obtain the corresponding 2-aminonitrile as the main product, the reaction is stopped when approximately one-third of the quantity of hydrogen required for complete reduction has been absorbed. To obtain the 1,3-diaminoalkane, the reaction is allowed to go to completion as evidenced by cessation of hydrogen absorption. After cooling the autoclave, the product is removed, filtered to separate the catalyst, and worked up by precision fractional distillation or by other conventional methods suitable for isolating the products of the reaction.

It is particularly desirable in the practice of this invention to carry out the reaction in the presence of anhydrous ammonia, which not only serves as a solvent for the reaction but which tends to stabilize the imino group and minimize condensation of the products during the hydrogenation step to form undesirable secondary and tertiary amines, tars, and other products. The amount of ammonia should be at least an equimolecular proportion based on the quantity of 2-iminonitrile employed as starting material. Other solvents are not essential for the successful operation of the process, although in many instances the use of an organic solvent has been found beneficial in improving yields and reducing the conversion to degradation and other by-products. Hydrocarbons, alcohols, and ethers are among the preferred solvents as exemplified by toluene, methanol, and dioxane. These materials are but typical examples, and a wide variety of other solvents of the same general class can be used with good effect. Generally speaking, if a solvent is employed, it is preferred to use methanol, owing to its low cost, freedom from catalyst poisons, excellent solvent action on both the starting materials and products, and ease with which it is separated from the crude hydrogenation mixtures without introducing needless product losses.

As catalysts for the process of the invention, various forms of finely divided metals of the eighth group of the periodic table may be employed. Several types of catalysts are specifically referred to in the following examples, and in general, the nickel and cobalt catalysts of the prior art are eminently satisfactory. These materials may be employed in finely divided metallic form or supported on porous carriers such as kieselguhr, pumice, silica, alumina, and the like. Suitable catalysts may, for example, be prepared by reducing the oxides, hydroxides, carbonates, oxalates, formates, etc. of nickel and cobalt at elevated temperatures with a hydrogen containing gas, or by caustic activation of a finely ground alloy of cobalt or nickel with an alkali-soluble metal such as aluminum. In general, finely divided metallic cobalt catalysts are preferred in the practice of this invention owing to their superior activity, selectivity, and lack of a tendency to induce or promote undesirable side reactions. These catalysts are preferably used in amounts ranging from 3–15 parts by weight based on the quantity of 2-iminonitrile employed as starting material.

The process of this invention is generally applicable to 2-iminonitriles represented by the general formula:

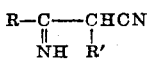

These materials may be open-chain compounds derived from aliphatic mononitriles, or alicyclic compounds in which R and R' of the above formula comprise the ends of a simple or substituted polymethylene chain. As examples typical of this general class of compounds are: 2-iminobutyronitrile; 1-cyano-2-iminocyclopentane; 12-imino-13-cyanotricosane; and 5-imino-6-cyanononane.

2-iminonitriles prepared by any of the conventional methods described in the prior art are suitable for conversion to 2-aminonitriles and 1,3-diaminoalkanes according to the embodiments of this invention. It is particularly convenient, however, to employ as raw materials, appropriate aliphatic mono- and dinitriles, which can be obtained economically and in high yields from the corresponding acids by vapor phase catalytic dehydration in the presence of ammonia and suitable active solid contact materials. Conversion of the nitriles to 2-iminonitriles is brought about readily and smoothly by treating with an equimolar quantity of an alkali metal condensing agent. Acetonitrile and adiponitrile are, for example, transformed respectively to diacetonitrile (2-iminobutyronitrile) and 1-cyano-2-iminocyclopentane by refluxing for a short period in ethanol solution in the presence of a condensing agent such as sodium ethoxide. Other alkali metal condensing agents, such as sodium naphthalene, lithium ethoxide, potassium amide and the sodium derivative of methyl aniline may be substituted for sodium ethoxide in similar condensations.

Another important procedure for the synthesis of 2-iminonitriles involves intermolecular condensation of nitriles in the vapor phase in contact with certain simple or promoted metal oxides. For example, 1-cyano-2-iminocyclopentane was prepared from adiponitrile by the following process: A vertically mounted, electrically heated reaction tube was charged with 250 parts by volume of 8–14 mesh grains of fused quartz and 75 parts by volume of 1/8" manganese chromite pellets prepared as described in U. S. Patent 2,108,156. The tube and its contents were heated to 400° C. and the manganese chromite catalyst reduced in a stream of hydrogen gas until water vapor was found to be absent from the exit gas stream. The temperature of the catalyst bed was then lowered to 300° C. and a stream of ammonia gas passing at the rate of 20.9 parts by weight per hour substituted for the hydrogen. Liquid adiponitrile was introduced into the ammonia stream at the uniform rate of 65 parts by weight per hour. The adiponitrile was vaporized in contact with the fused quartz preheater section of the reactor tube and swept through the catalyst bed. Under these conditions, the space velocity was 548 volumes of gas per unit volume of catalyst and the contact time was 3.1 seconds. From 380 parts of adiponitrile processed during 5.8 hours, there was obtained 361 parts of crude product from which there was isolated 61.4 parts of 1-cyano-2-iminocyclopentane, M. P. 147° C., and 299.6 parts of adiponitrile suitable for recycling in the process. The yield of iminonitrile was 76.3 per cent of theory based on the amount of adiponitrile transformed in the process.

The following examples serve to illustrate the processes of this invention and demonstrate suitable catalytic conditions for the catalytic conversion of 2-iminonitriles to 2-aminonitriles and 1,3-diaminoalkanes. Quantities given are expressed as parts by weight unless otherwise stated.

*Example 1*

Fifty parts of 1-cyano-2-iminocyclopentane, 50 parts of anhydrous ammonia, and 5 parts of alloy-skeleton nickel-on-alumina catalyst were charged into a high pressure autoclave equipped with an efficient device for mechanical agitation. The mixture was heated to 120° C. and treated with hydrogen under pressures between 2000 and 3000 lbs. per square inch for about 5 hours. During this period hydrogen was absorbed smoothly as indicated by a total pressure drop of 1800 lbs. The reaction vessel was cooled to room temperature, the crude product removed, and the catalyst separated by filtration. Precision fractional distillation of the product gave 5.4 parts of cyclopentylamine (hydrochloride, M. P. 204–205° C.; benzoyl derivative, M. P. 159.5° C.), 19 parts of 2-aminomethylcyclopentylamine, B. P. 72–75° C./9 mm., and 21 parts of high-boiling tarry material. The 2-aminomethylcyclopentylamine was identified by the following analytical values.

Calc'd. for C₆H₁₄N₂:

C, 63.2; H, 12.3; N, 24.6; N. E., 57.

Found:

C, 62.7; H, 11.9; N, 24.7; N. E., 60.

*Example 2*

Forty-one parts of 2-iminobutyronitrile (diacetonitrile) was dissolved in 150 cc. of methanol and charged into a high pressure hydrogenation autoclave with 10 parts of alloy-skeleton nickel catalyst. Twenty parts of anhydrous ammonia was added and the mixture hydrogenated at 80° C. and a pressure of about 2000 lbs. per square inch. The absorption of hydrogen was rapid during the first half hour but proceeded more slowly over an additional period of 2-3 hours. On working up the product by fractional distillation at atmospheric pressure there were obtained 5 parts of low-boiling materials, B. P. 103°-145° C., 10.9 parts 1,3-diaminobutane, B. P. 145-147° C., and 2.7 parts of material, B. P. 147-165° C. The remainder of the product consisted of high-boiling tar.

Example 3

A mixture of 66 parts of 1-cyano-2-iminocyclopentane, 65 parts of methanol, 10 parts of finely divided elementary cobalt catalyst, and 50 parts of anhydrous ammonia was placed in a steel reaction vessel equipped with an efficient agitator, and adapted for operation at elevated pressures and temperatures. Hydrogen under pressure was admitted to the autoclave until the total pressure was 2000-3000 lbs. per square inch, and the mixture was hydrogenated with vigorous agitation at 120° C. Absorption of hydrogen was complete in two hours. The crude reaction mixture was worked up according to the procedure of Example 1. The products were as follows: Foreshots, B. P. 60-82° C./19 mm., 2.4 parts; 2-aminomethylcyclopentylamine, B. P. 87° C./18 mm., 41 parts; and residue, 9.1 parts.

If the above process is duplicated in all details except that the reaction is stopped when approximately one-third the amount of hydrogen theoretically required for the formation of 2-aminomethylcyclopentylamine has been absorbed, the hydrogenation proceeds selectively to yield 1-cyano-2-aminocyclopentane as the major product of the reaction.

Example 4

Seventy-three parts of dilauronitrile (12-imino-13-cyanotricosane), 25 parts of anhydrous ammonia, 75 parts of dioxane, and 10 parts of finely divided metallic cobalt catalyst were charged into a high pressure hydrogenation autoclave. The mixture was treated with hydrogen under a pressure of 2000-3000 lb. per square inch at 120° C. for 5 hours during which time the total pressure drop corresponded to approximately one-third the amount theoretically required for complete reduction of the starting material. On separating the catalyst and evaporating the solvent there was obtained a yellow oil which consisted predominantly of 12-amino-13-cyanotricosane.

Example 5

Thirty parts of diacetonitrile (2-iminobutyronitrile) was hydrogenated at 120° C. under a total pressure of 2500-3000 lb. per square inch in the presence of 50 parts of anhydrous ammonia, 75 parts of methanol, and 10 parts of easily suspensible alloy-skeleton cobalt catalyst which is described in copending application, Serial No. 329,299, filed April 12, 1940. The reaction was complete in 2-3 hours and on working up the crude catalyst-free product there was obtained 15 parts of 1,3-diaminobutane, B. P. 145-147° C.

Example 6

A mixture consisting of 75 parts of dilauronitrile, 25 parts of anhydrous ammonia, 75 parts of methanol and 17 parts of an active elementary cobalt catalyst was placed in a steel reaction vessel provided with efficient means of agitation and equipped for operation at high temperatures. The contents of the vessel were treated with hydrogen under pressures between 1500 and 3000 lb. per square inch at temperatures of 115°-120° C., and the reaction was continued until the absorption of hydrogen ceased. The vessel was cooled, the reaction mixture removed and filtered to separate the catalyst, and the filtrate refined by vacuum fractional distillation. There was obtained 24 parts of 12-amino-13-aminomethyltricosane, B. P. 180° C./5 mm.

The products of this invention, the 1,3-diaminoalkanes and 2-amino aliphatic nitriles, comprise a valuable class of bi-functional organic compounds that are particularly useful as intermediates for the manufacture of resins and polycondensation type synthetic polymers. These products also have wide utility in the fields of resin-modifying agents, textile chemicals, antiacid compositions, and as intermediates for the synthesis of insecticides, dyestuffs, and pharmaceuticals.

Various changes may be made in the details and preferred embodiments of this invention without departing therefrom or sacrificing the advantages thereof.

We claim:

1. A process for the hydrogenation of 2-iminonitriles which comprises effecting contact of a 2-iminonitrile with hydrogen, in the liquid phase, at a temperature within the range of 50 to 170° C. and under a hydrogen partial pressure of at least 10 atmospheres, in the presence of at least an equimolecular proportion of anhydrous ammonia, based on the quantity of 2-iminonitrile employed, and in the presence of a base metal catalyst of the eighth group of the periodic table.

2. A process for the hydrogenation of 2-iminonitriles which comprises effecting contact of a 2-iminonitrile with hydrogen, in the liquid phase, at a temperature within the range of 50 to 170° C. and under a hydrogen partial pressure of at least 10 atmospheres, in the presence of at least an equimolecular proportion of anhydrous ammonia, based on the quantity of 2-iminonitrile employed, in the presence of a base metal catalyst of the eighth group of the periodic table, and terminating the reaction at a time such that approximately ⅓ of the quantity of hydrogen required for complete reduction of the 2-iminonitrile has been absorbed.

3. A process for the hydrogenation of 2-iminonitriles which comprises effecting contact of a 2-iminonitrile with hydrogen, in the liquid phase, at a temperature within the range of 50 to 170° C., and under a hydrogen partial press of at least 10 atmospheres, in the presence of at least an equimolecular proportion of anhydrous ammonia, based on the quantity of 2-iminonitrile employed, in the presence of a base metal catalyst of the eighth group of the periodic table, the process being continued until cessation of hydrogen absorption.

4. The process of claim 1 characterized in that the 2-iminonitrile is 1-cyano-2-imino cyclopentane.

WILBUR A. LAZIER.
BENJAMIN W. HOWK.